March 13, 1951 W. W. SHARPE 2,545,215
FLY SWATTER
Filed Aug. 13, 1947
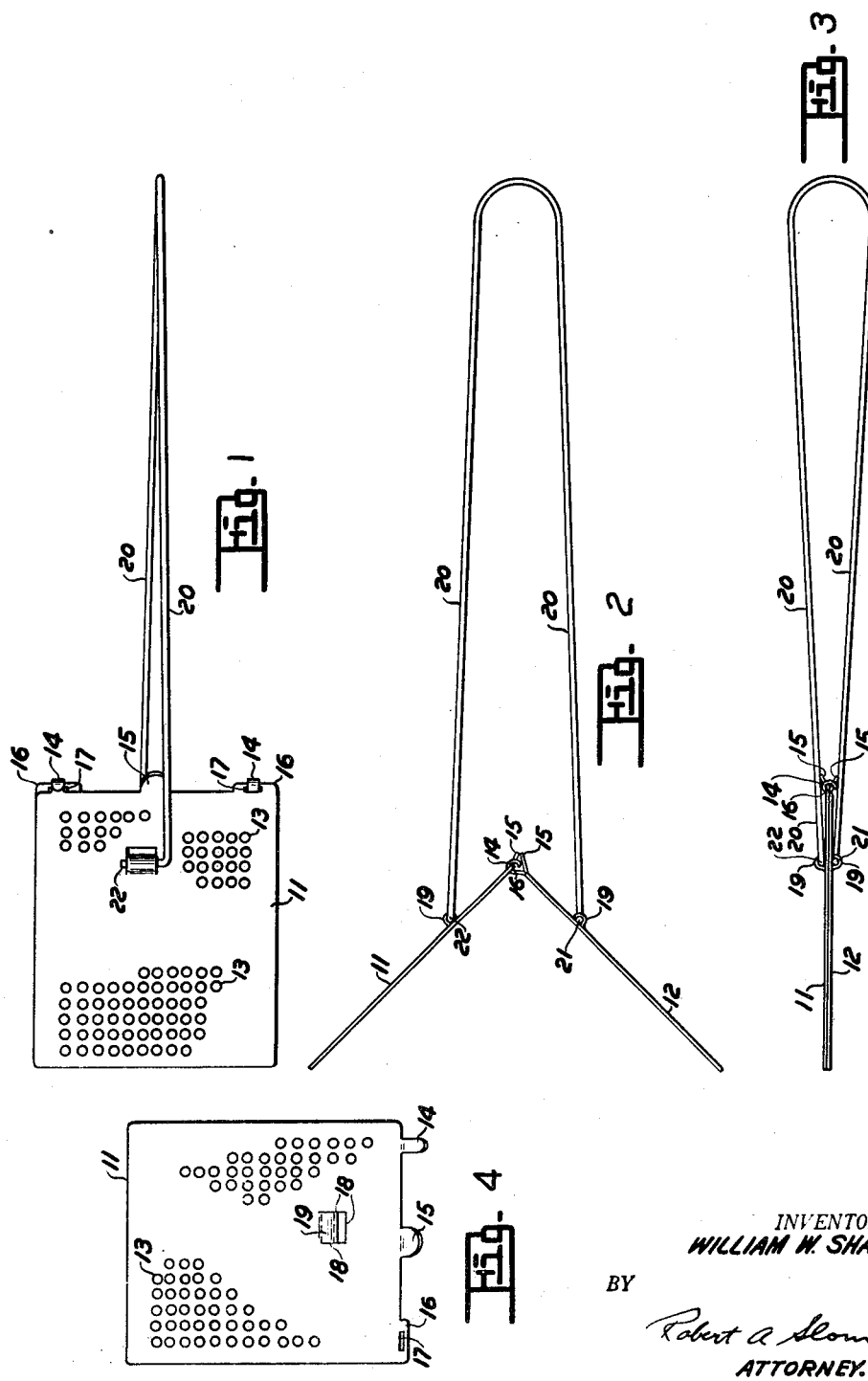
INVENTOR.
WILLIAM W. SHARPE.
BY
Robert A. Sloman
ATTORNEY.

UNITED STATES PATENT OFFICE 2,545,215

FLY SWATTER

William W. Sharpe, Detroit, Mich.

Application August 13, 1947, Serial No. 768,297

3 Claims. (Cl. 43—137)

This invention relates to a fly swatter, and more particularly to a fly swatter construction for killing flies and other insects while in flight.

As contrasted with the conventional fly swatter construction, the present invention incorporates a pair of flat perforated blades which are hingedly joined at one of their edges, and by means of a resilient handle normally maintaining said blades angularly open, are adapted to be forcefully brought together in substantially parallel juxtaposition for killing a fly or insect therebetween.

It is therefore the principal object of this invention to provide a fly swatter for catching and killing a fly while in flight.

It is the further object of this invention to provide by a simplified and inexpensive structure, a fly swatter incorporating a pair of flat perforated blades angularly joined together at one of their edges, together with a formed resilient wire handle secured to each of said blades, and which is adapted to forcefully bring said blades together upon manual compression thereof.

These and other objects will be seen from the following specification and claims in conjunction with the appended drawing in which:

Figure 1 is a plan view of the fly swatter as it appears when the blades are closed.

Figure 2 is a side elevational view of the fly swatter in its normal inoperative position with its blades open.

Figure 3 is a side elevational view of the same with the handle compressed and the blades correspondingly closed; and Figure 4 is a plan view of one of the two similar blades prior to assembly.

It will be understood that the above drawing illustrates merely a preferable embodiment of the invention and that other embodiments are contemplated within the scope of the claims hereafter set out.

This application is a continuation in part of my copending application Serial No. 740,437 filed April 9, 1947, and relating to a fly swatter now Patent No. 2,496,415 of February 7, 1950.

Referring to the drawing, a pair of similarly formed blades 11 and 12 perforated throughout at 13 are angularly joined to each other at one of their edges as shown in Figures 1 and 2.

Blades 11 and 12 are identical in shape to simplify the cost of manufacture, one of said blades being shown in Figure 4 for illustration. Blades 11 and 12 are substantially rectangular in shape, and are initially formed with projecting tabs 14, 15 and 16, with the latter having a slot 17 therein.

Tabs 14 form an integral part of blades 11 and 12 and are initially coplanar with blades 11 and 12, however, upon or prior to assembly are formed outwardly substantially in a semi-circle for respective retaining engagement within the corresponding slot 17 of the opposing blade.

Blades 11 and 12 are so formed and constructed that when one thereof is inverted over the other, the tab 14 of one is in registry with the slot 17 of the other, to provide a simplified hinge construction as shown in Figure 1.

Central tabs 15 are formed outwardly at an angle to the outer surfaces of blades 11 and 12 and are adapted to cooperatively engage each other limiting the outward angular positions of blades 11 and 12 as in Figure 2.

Tabs 15 serve another important purpose in preventing tabs 14 as arcuately formed from disconnecting themselves from the corresponding slotted tabs 16, even though the same are loosely joined. In fact the connection is so loose in view of the semi-circular shape of the formed tabs 14, that but for tabs 15 blades 11 and 12 could be easily separated.

As constructed however, said blades are permanently and hingedly joined to each other so long as tabs 15 remain unchanged in their angular position relative to said blades.

Blades 11 and 12 have three slits 18 therein, and the material of the blade bounded by said slits is rolled or formed outwardly in a semi circle to form the projecting handle receiving and retaining elements 19.

The swatter handle, Figures 1, 2 and 3, consists of the spring wire operating elements 20 formed from a single piece of wire into substantially U-shape, being slightly diverging in the direction of its free ends. As viewed in Figure 2, the outer ends 21 and 22 of handle elements 20 are bent transversely thereto at substantially right angles and extend respectively in opposite directions and parallel to each other.

Outer end 21 as viewed in Figures 2 and 3 cooperatively projects up into handle retaining element 19 forming a part of blade 12, while the other end portion 22 cooperatively projects downwardly within the similar handle retaining element 19 forming a part of the other blade 11.

As shown in Figure 4 the retaining element 19 is positioned off-center so that when blade elements 11 and 12 are assembled, said retaining elements 19 are off-set with respect to each other being upon opposite sides of the longitudinal center line of said blade elements.

Consequently while the handle securing members 21 and 22 project in opposite directions for engagement within the securing elements 19, it is seen that when assembled, said handle elements 20 are only slightly off-set from each other as viewed in Fig. 1.

Prior to assembly the handle elements 20 are substantially coplanar. On assembly one of the end elements, 22 for instance, is loosely inserted down through the retaining member 19 of blade 11. The other end element 21 as well as its supporting handle portion 20 must be bent downwardly against the resiliency of its spring wire construction. Said end element is then inserted from the lower side into the hollow retaining element 19 on the blade 12 and projected upwardly thereinto.

Due to the resiliency of the latter wire handle element and its tendency to remain coplanar with the other handle element, and due to the opposing arrangements of the members 21 and 22 it is seen that once assembled with blades 11 and 12 said handle element will stay assembled for normal usage.

When inoperative, handle 20 takes the diverging shape shown in Figure 2 with blades 11 and 12 angularly spaced apart. Figure 3 shows the handle elements 20 compressively converged together as by the hand of the user to bring the blades 11 and 12 into parallel cooperative relation for trapping and killing a fly or other insect. Elements 20 are compressed against the resiliency of the wire of which they are constructed, and will immediately open to the position of Figure 2 upon manual release of said handle elements.

In operation the handle is held inwardly of its free ends and blades 11 and 12 may be mechanically brought together with a quick snapping action through manual compression of said handle. The speed of closing blades 11 and 12 is dependent upon the compressive action of the operator's hand upon handle elements 20.

After a little practice the user can use the fly swatter above described with deadly accuracy.

As above described the outward opening movement of blades 11 and 12 under the expansive action of the previously compressed resilient handle elements 20, is limited by the cooperative engagement of the outer ends of the respective tabs 15 on the common inner edges of blades 11 and 12.

The oppositely projecting elements 21 and 22 are retained within members 19, and at the same time cooperatively bear against the outer walls of blades 11 and 12 bridging the slots formed therein by the slit portions 18. In fact it appears that elements 21 and 22 bear against the outer walls of blades 11 and 12 and are retained against said walls by the curved elements 19.

By killing the fly while in flight, or for that matter any other insect, stains and smudges upon the woodwork, walls, draperies, furniture and other surfaces are eliminated.

Having described my invention, reference should now be had to the claims which follow for determining the scope thereof.

I claim:

1. A fly swatter comprised of a pair of flat angularly arranged blades hingedly joined to each other at one of their edges, hollow cylindrical sockets formed from and arranged upon the outer surface of said blades, a U-shaped spring wire handle, and oppositely arranged securing legs projecting normally from the ends of said handle in substantial parallel relation, and respectively nested and pivotally positioned within said sockets, whereupon manual compressive movement of the portions of said handle toward each other said blades are forcefully brought together, said legs extending in opposite directions and in a plane normal to the direction of flexing movements of said handle whereby said legs are retained against dislodgement from said sockets.

2. A fly swatter comprised of a pair of flat blades, an arcuately formed tab and a tab receiving slotted portion arranged in spaced relation at one of the edges of each blade, whereby said blades may be hingedly joined to each other with the formed tab of one blade extending through the slotted portion of the other blade, hollow cylindrical sockets formed from and arranged upon the outer surface of said blades, a U-shaped spring wire handle, and oppositely arranged securing legs projecting normally from the ends of said handle in substantial parallel relation respectively nested and pivotally positioned within said sockets, whereupon manual compressive movement of portions of said handle towards each other said blades are forcefully brought together, said legs extending in opposite directions and in a plane normal to the direction of flexing movements of said handle whereby said legs are retained against dislodgement from said sockets.

3. A fly swatter comprised of a pair of flat blades, an arcuately formed tab and a tab receiving slotted portion arranged in spaced relation at one of the edges of each blade, whereby said blades may be hingedly joined to each other with the formed tab of one blade extending through the slotted portion of the other blade, angularly arranged tabs extending from the hinged edges of said blades cooperatively engagable to limit the outward angular positioning of said blades, hollow cylindrical sockets formed from and arranged upon the outer surface of said blades, a U-shaped spring wire handle, and oppositely arranged securing legs projecting normally from the ends of said handle in substantial parallel relation respectively nested and pivotally positioned within said sockets, whereupon manual compressive movement of said handle said blades are forcefully brought together, said legs extending in opposite directions and in a plane normal to the direction of flexing movements of said handle whereby said legs are retained against dislodgement from said sockets.

WILLIAM W. SHARPE.

REFERENCES CITED

The following references are of record in the file of this patent:

UNITED STATES PATENTS

| Number | Name | Date |
|---|---|---|
| 502,056 | Teate | July 25, 1893 |
| 550,556 | Dodge | Nov. 26, 1895 |
| 666,633 | Farmer | Jan. 22, 1901 |
| 1,179,114 | Laubenstein | Apr. 11, 1916 |
| 1,223,238 | Battige | Apr. 17, 1917 |
| 1,557,454 | Hammer | Oct. 13, 1925 |
| 1,593,930 | Carrier | July 27, 1926 |
| 1,635,810 | Cleveland | July 12, 1927 |
| 2,191,126 | Gustke | Feb. 20, 1940 |
| 2,377,717 | Reilly | June 5, 1945 |
| 2,434,364 | Linding | Jan. 13, 1948 |